Figure 1A:
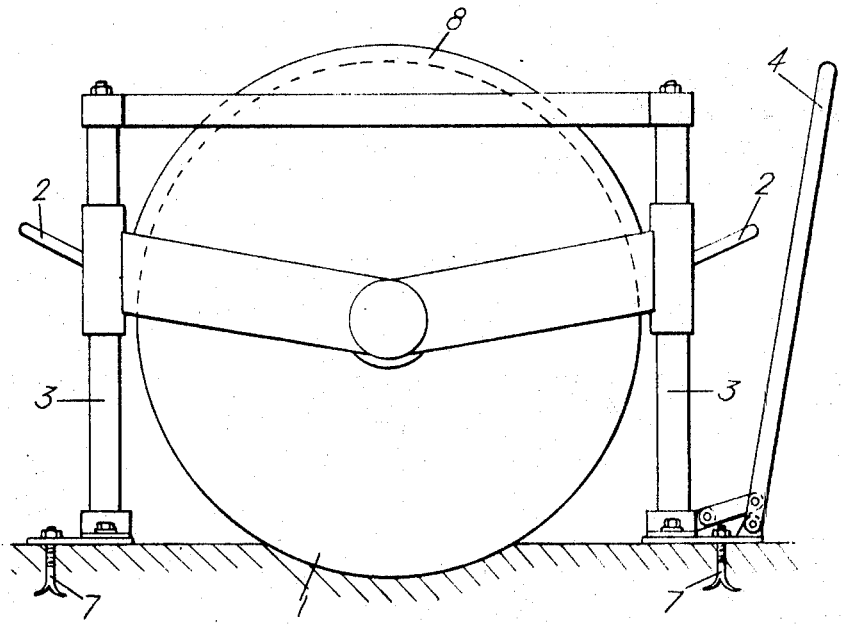

United States Patent [11] 3,595,071

[72] Inventors Manuel Coelho Mendes Da Rocha
 Av° dos Estados Unidos da America, 95-3° Dt ;
 Jorge Neves Da Silva, Rua Cabo Verde, 14-2° Dt° ; Joao Jose Andrade Baptista Lopes, Av° do Brasil 182-1° A, all of Lisbon, Portugal
[21] Appl. No. 670,699
[22] Filed Sept. 26, 1967
[45] Patented July 27, 1971

[54] METHOD FOR DETERMINING STRESSES IN SOIL
 2 Claims, 3 Drawing Figs.
[52] U.S. Cl. ................................................. 73/88, 73/84
[51] Int. Cl. .................................................. G01n 3/00
[50] Field of Search .......................................... 73/94, 88, 88 E, 84; 37/94

[56] References Cited
 UNITED STATES PATENTS
 3,446,062 5/1969 Goodman et al. ............ 73/88 (E)
 3,419,976 1/1969 Reising ....................... 37/94
 OTHER REFERENCES
 Engineering News-Record, June 7, 1934 " Accuracy of Goldbeck Cell in Laboratory Tests" by W. H. Seaquist pp. 730— 732

Primary Examiner—Jerry W. Myracle
Attorney—Wenderoth, Lind & Ponack

ABSTRACT: A novelly improved method of more economically expeditiously and more accurately obtaining stress determinations existing originally as in an undisturbed test soil, rock or other medium which method comprises cutting a smooth, very thin slot in the surface of the medium to be tested so as not to unduly disturb the stabilized natural structure of it and the adjoining medium, inserting a flat-type jack of a size and thinness corresponding essentially to the slot dimension so as to substantially completely fill the slot without need of infilling between the jack sides and test medium to thereby minimally and negligibly disturb the state of stress therein, subsequently applying on the walls of the major dimension of the slot, by means of a fluid pressure directed into said flat-jack, a force to cancel those minimal stresses in the test medium resulting from the initial cutting of the slot, and then finally measuring the pressure strains exerted by the fluid pressure in said jack on the sidewalls of the slot, whereby initial stress which existed in the test medium before the application of a disturbing action can be readily calculated. Such calculations may be derived from using the known mathematical theory of elasticity, and further a graphic curve can be plotted of the deformations as a function of the slot depth from which to derive the modulus of elasticity of the test medium.

MANUEL COELHO MENDES DA ROCHA,
JORGE NEVES DA SILVA AND
JOÃO JOSÉ ANDRADE BAPTISTA LOPES, Inventors By Wenderoth,
Lind and Ponack, Attorneys MANUEL COELHO MENDES DA ROCHA,
JORGE NEVES DA SILVA AND
JOÃO JOSÉ ANDRADE BAPTISTA LOPES,

*Inventors*

By Wenderoth,
Lind and Ponack  *Attorneys*

METHOD FOR DETERMINING STRESSES IN SOIL

The knowledge of the state of stress inside the ground (soil, rock mass, etc.) is nowadays widely recognized as very important since from it it is possible to derive the mechanical characteristics, bearing capacity, structure and so on and consequently its behavior as the foundation of a structure.

Methods are now available by means of which stresses can be determined in the ground both at the surface, especially in gallery walls, and inside at points reached by means of boreholes. The determination of the state of stress from stress values measured in gallery walls has the disadvantage that the initial state of stress is changed by the excavation. This change is due, on one hand, to the presence of the hole, and on the other, to the excavation itself. Whereas the former disturbance can be taken into account by calculating the state of stress around the gallery, it is otherwise with the latter. Hence the limited interest of a stress-determination method at the surface relative to the state of stress inside, in spite of it being especially adequate for obtaining the field of stresses in the neighborhood of gallery walls, which is of the utmost interest for tunnel and gallery driving and maintenance as tunnel-lining design and construction methods.

Among the methods in use for determining stresses at the surface, one of the most widely used is the so-called "flat-jack method." As is well known, the method consists essentially in cutting a slot in the rock or test soil medium with a given length and a certain depth, and in applying on the slot walls flat-jacks filled with oil under pressure which transmit to the rock soil medium wall a uniform pressure which cancels the deformations produced in the neighborhood of the slot when this was cut. This pressure equals the normal stress in certain areas parallel to the plane of the slot.

In the flat-jack method such as it has been applied, the square or rectangular slot is obtained by means of a series of holes, for instance 5cm. in diameter each, side-by-side and partly superposed.

In the technique developed at Laboratorio Nacional de Engenharia Civil the slot is segment-shaped and is cut by means of a disk. This procedure has the following advantages: 1) the disturbance in the ground is negligible: 11) the slot has a sharply defined shape and is very narrow approximately 5mm.; lll) the time required for the operation is considerably reduced.

As for the disturbance in the ground it is obviously of great interest to reduce it as much as possible, due to its possibly great influence on the state of stress to be determined, especially because the tests are usually carried out at the surface of the ground already much disturbed by the tunnel-driving operations. Regarding the dimensions of the slot, the narrower it is the nearer the basic assumption of the flat-jack method is approached; according to this assumption the effect of cutting the slot can be cancelled by a normal stress applied on the major faces of the slot i.e. the effect of the stresses on a face normal to the major faces can be neglected, due to this face being very low. The slot faces obtained by the cutting disk being very smooth, the cancelling pressure can be directly applied on the soil or other medium mass by means of flat-jacks that exactly fit the walls without need of mortar or other infilling material, so that the applied pressure is transmitted better then in the methods so far used and additionally the time required for the infilling material to harden is spared. Other advantages are that the flat-jacks are reusable and, given the very small slot height required, the jacks even for high pressures are not difficult to manufacture. Tests carried out by this procedure developed at the Laboratorio Nacional de Engenharia Civil are very rapid and inexpensive.

The method has the additional advantage of being adequate to determining stresses at any depth of the slot, for which it suffices to stop the cutting operation and to apply a flat-jack with the dimensions required for the depth of the slot. This operation is facilitated by a set of easily movable flat-jacks with approximately the same shape, in which only the length of the chord is variable. It is thus possible to detect changes in the state of stress in the neighborhood of the soil surface. By means of simplifying assumptions on the behavior of the soil or, in the still more important case of a rock mass, of the rock, it is possible to derive the modulus of elasticity of the medium from the curve of deformations as a function of the depth of the slot. This is another considerable advantage of the method.

The equipment which was especially developed to apply this new procedure; consists of a "cutting machine" and "flat-jacks."

Figure 1B:
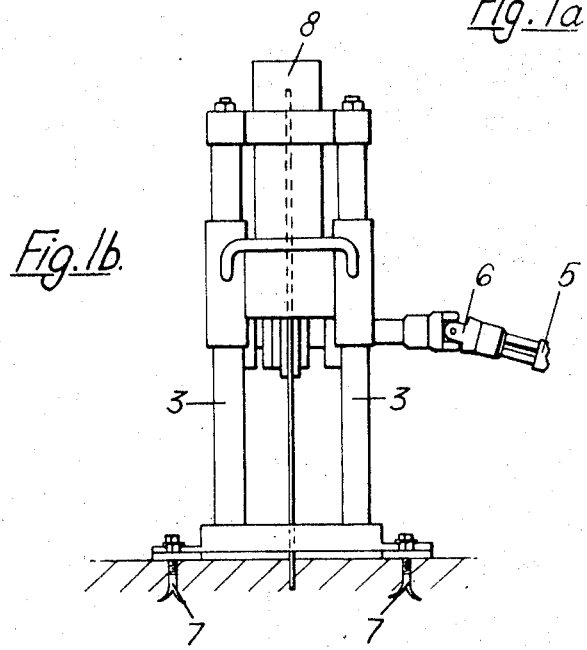
Figure 2:
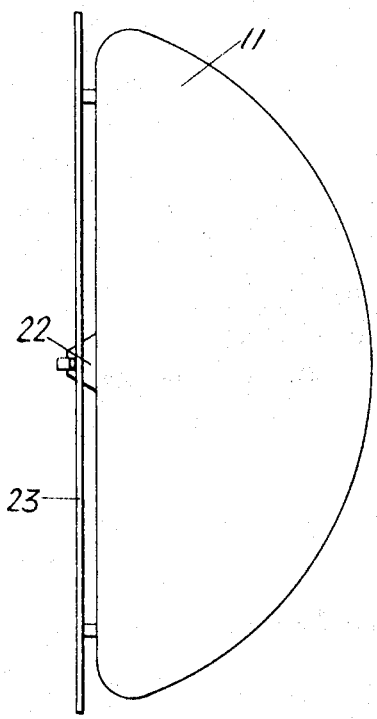

With the above and other objects in view which will become apparent from the detailed description below, a preferred form of the invention is shown in the drawings in which:

FIG. 1a is a side view of the cutting machine,
FIG. 1b is an end elevational view of the machine, and
FIG. 2 is an elevational view of a flat-jack.

The cutting machine as shown in FIGS. 1a and 1b is fitted with a diamond-edged disk 1 with a suitable diameter, which is operated by hand by means of the handles (2) and is guided by four columns (3). A lever (4) facilitates the advance of the disk by making possible its alternate movement in its own plane, normal to its advance. The disk can be operated by an electric, compressed-air or other engine, through a sliding coupling and two cardan joints (6) which enable the disk to move and facilitates the assembly of the cutting machine and the engine. The cutting machine can be bolted (7) on the surface where the slot is going to be cut. A steel flap (8) protects the operator against projections of the water that cools the cutting edge of the disk.

The flat-jacks (FIG. 2), all with the same shape, are very easily obtained by bending a steel sheet and welding the curved edge 11. The cell thus formed is filled with a fluid under pressure (oil, water, etc.). The flat-jacks are about as thick or deep as the slot is high. A flap 23 protects the feeding nipple 22 so as to prevent projections of fluid under pressure in case of a rupture in the jack. As indicated the flat-jacks are reusable without difficulty.

A test for determining a stress (including the installation of the cutting machine, the cutting of the slot, the application of the flat-jack and the determination of the cancelling pressure) takes about 2 hours even in considerably hard rock or other medium. It is to be understood that the improved method can be used in various types of test media, whether of relatively soft earth or of relatively hard rock or other more solid type formations, and the use of the term "test soil medium" is intended to cover all types.

We claim:

1. A method for more economically, quickly and more accurately obtaining stress determinations existing originally as in an undisturbed test soil medium comprising the steps of:
   a. disc cutting a smooth, very narrow or thin slot in the surface of the medium to be tested, thereby not unduly disturbing the stabilized natural structure of the adjoining medium or altering its specific characteristics;
   b. inserting a flat-type jack of size and thinness corresponding essentially to the slot dimension so as to substantially completely fill the slot without need of infilling between the jack sides and test medium, thereby minimally and negligibly disturbing the state of stress in the test medium;
   c. applying on the walls of major dimension of the slot by means of fluid pressure directed into said flat-jack, a force to cancel those minimal stresses in the test medium resulting from the initial cutting of the slot, and
   d. then measuring the pressure strains exerted by the fluid pressure in said jack on the sidewalls of the slot whereby initial stress which existed in the test medium before the application of a disturbing action thereto can be readily calculated.

2. A method as defined in claim 1 further including the step of plotting a curve of deformations as a function of the depth of the slot to thence derive the modulus of elasticity of the test medium.